United States Patent [19]
Sugimori et al.

[11] Patent Number: 5,142,364
[45] Date of Patent: Aug. 25, 1992

[54] HIGH RESOLUTION COLOR TELEVISION SYSTEM

[75] Inventors: Yoshio Sugimori, Tokyo; Yosai Araki, Tokorozawa; Yoshihide Kimata, Machida; Susumu Takayama, Kamakura; Joji Urano, Tokyo, all of Japan

[73] Assignee: Nippon Television Network Corporation, Tokyo, Japan

[21] Appl. No.: 646,010

[22] Filed: Jan. 28, 1991

[30] Foreign Application Priority Data

Feb. 1, 1990 [JP] Japan ................................. 2-22827

[51] Int. Cl.⁵ .............................................. H04N 7/00
[52] U.S. Cl. ....................................... 358/141; 358/12
[58] Field of Search ................. 358/141, 12, 138, 142, 358/

[56] References Cited

U.S. PATENT DOCUMENTS 4,713,688 12/1987 Güttner ............................. 358/141
4,866,519 9/1989 Lucas et al. ...................... 358/12 X
4,868,654 9/1989 Juri et al. .......................... 358/141 X

FOREIGN PATENT DOCUMENTS 245786 10/1987 Japan.

OTHER PUBLICATIONS

ITEJ Report, vol. 14, No. 8, pp. 31-36, Jan. 30, 1990.
ITEJ Report, vol. 14, No. 8, pp. 43-48, Jan. 30, 1990.

Primary Examiner—Victor R. Kostak
Attorney, Agent, or Firm—Morris Fidelman; Franklin D. Wolffe

[57] ABSTRACT

A high resolution color television system, in the transmitting device of which part of pixels are thinned out in both horizontal and vertical directions and the remaining pixels are vertically gathered in the central portion of the image screen to form an image signal, leaving upper and lower blank portions, and horizontal and vertical informations indicating the quantitative relations between the removed pixels and the vertically and horizontally adjoining pixels are treated as first and second auxiliary signals and inserted in the upper and lower blank portions to form a television signal for transmission, and in the receiving device of which the image signal and the auxiliary signals are separated from the television signal and respectively treated in a manner opposite to that in the transmitting device to recover the original image signal for display by a kinescope.

1 Claim, 6 Drawing Sheets

HIGH RESOLUTION COLOR TELEVISION SYSTEM

BACKGROUND OF THE INVENTION

This invention relates to a television system and, especially, to such a system in that the high frequency components of luminance and/or chrominance signals are multiplexed with a television signal of the standard system for transmission, thereby obtaining an image improved in resolution of brightness and/or color in the receiver.

While, in the present television system, the number of scanning lines is 525 (effectively, about 480 lines) and the horizontal bandwidth is 4.2 MHz, the transmitting equipments have a power which enables such a high resolution treatment corresponding to 1.5 to 2 times horizontal resolution and 6 to 8 MHz horizontal bandwidth. Due to limitation of the bandwidth of the broadcasting wave, it is impossible to transmit all of the high resolution image informations existing in the transmitter side to the receiver side. However, if the high resolution image information is transmitted in respect of a part of the image screen, such as the central part or the title part, in which high resolution is desired, the resultant reproduced image can provide the viewer with such an impression in that the whole image has been improved in resolution.

An improved system which was developed from this point of view is disclosed in the Japanese opened patent gazette No. S62-245786. In this system, the image screen is finely divided into small blocks and each block is provided with an address. Part of pixels are thinned out from each block and a television signal is prepared mainly from a luminance signal based upon the remaining pixels. For such a block which requires high resolution, a difference signal between the mean value of the luminance signal of the block and luminance information of the pixels thinned out is multiplexed to the television signal together with the address of the block for transmission.

In reception, the multiplexed signals are separated and the luminance signal of the pixels which were thinned out in the transmitter side is recovered from the mean value of the luminance signal of the block specified by the address and the above-mentioned difference signal. The recovered luminance information is inserted between the luminance signals to recover the original form before thinning in the transmitter side and to display the same. Accordingly, in the displayed image, high resolution is obtained only in those blocks having the difference signal transmitted, while the remaining portion exhibits resolution similar to that of the prior art television display screen.

When the above-mentioned television signal is received by a prior art receiver, compatibility of the receiver is obtained so far as it goes, since the whole image is displayed at resolution similar to that in the case of reception of the prior art television broadcast.

In the above-cited system, however, the amount of high resolution information which can be multiplexed to the television signal is limited and, therefore, it may be impossible to transmit the thinned information, in spite of a considerable amount of high resolution information included in the original signal in a certain block. This may result in some frequency turnaround at the position of that block in the screen, due to lack of high resolution information.

Moreover, in the case of receiving a broadcasting wave of the above-cited system by a conventional receiver, a little discontinuity of frequency characteristic occurs between the blocks since the pixels are treated for each block, and periodic non-uniformity is sometimes noticeable in some kind of image pattern since the blocks are arranged regularly.

Furthermore, the amount of high resolution information which can be transmitted is reduced by the amount corresponding to the address signal, since the address signal must be transmitted in combination with the high resolution information.

SUMMARY OF THE INVENTION

Accordingly, an object of this invention is to provide an improved television system which is free from the above-mentioned problems of the prior art system disclosed in the above-cited reference.

This object can be attained by the television system according to this invention, which is composed of a transmitting device and a receiving device.

The transmitting device comprises first thinning means for dividing an image screen into a plurality of vertical blocks each including pixels and thinning out a certain pixel from each block, and second thinning means for dividing the image screen into a plurality of horizontal blocks including pixels and thinning out a certain pixel from each block. The thinning order of these thinning means is optional. The first thinning means is provided with first weighting means for rearranging the remaining rows of pixels after thinning at equal intervals and weighting the rearranged pixels at their new position to compensate for their distance (difference) from the original signal, and the second thinning means is provided with second weighting means for effecting similar weighting function. The first thinning means is also provided with means for preparing a first auxiliary signal which includes a difference information between the thinned out pixel and the mean value of two weighted pixels which were directly above and below the thinned out pixel before thinning, and the second thinning means is further provided with similar means for preparing a second auxiliary signal. The pixels which were thinned out by the first and second thinning means and weighted by the first and second weighting means are arranged into a television signal of the standard system and the first and second auxiliary signals are multiplexed therewith for transmission.

Here, instead of preparing the first and second auxiliary signals for all of the pixels thinned out by the first and second thinning means and multiplexing all of them, it is also possible to prepare first and second single representative auxiliary signals for each group of the auxiliary signals and multiplex them.

The receiving device comprises means for separating the received signal into the television signal and the first and second auxiliary signals, a first synthesizing circuit for recovering a state corresponding to that before the thinning operation in the first thinning means from the first auxiliary signals and the television signal or a signal modified therefrom, a second synthesizing circuit for recovering a state corresponding to that before the thinning operation in the second thinning means from the second auxiliary signals and the television signals or a signal modified therefrom, and a display unit for displaying an image based upon the signals treated in both synthesizing circuits. The order of the first and second synthesizing circuits is optional.

It is now assumed in the transmitting device that the thinning operations are effected first by the first thinning device and then by the second thinning device.

In the first thinning device, a certain pixel is thinned out from each vertical block including a plurality of pixels. As a result, the vertical resolution is reduced, while the horizontal resultion is left unchanged. Next, in the second thinning means, a certain pixel is thinned out from each horizontal block including a plurality of pixels and, therefore, the resolution is reduced in both horizontal and vertical directions. In addition to these thinning operations, the pixels are moved to fill a space from which the pixels were thinned out and to equalize the pixel intervals and, also, the weighting operations are effected to compensate for the difference in wave height between the original signal and the pixels in the new position. Then, the standard television signal is prepared from the thinned, moved and weighted signals for transmission.

The difference between the pixels thinned out by the first thinning means and the mean value of the weighted signals of the pixels directly above and below the thinned pixels is derived as the first auxiliary signal. Similarly, the difference between the pixels thinned by the second thinning means and the mean value of the weighted signals of the pixels directly on the left and right of the thinned pixels is derived as the second auxiliary signal. These auxiliary signals are multiplexed to the standard television signal for transmission.

It is possible to narrow the frequency bandwidth necessary for multiplex transmission, if a single representative auxiliary signal is selected from each of two groups respectively composed of the first and second auxiliary signals, instead of transmitting the auxiliary signals of all pixels thinned from the above-mentioned blocks.

In the recieving device, the received signal is separated into the first and second auxiliary signals. In the first synthesizing means, the vertical resolution of the television signal is raised by an action opposite to that of the first thinning means and the first weighting means from the television signal and the first auxiliary signal and, in the second synthesizing means, the horizontal resolution of the television signal is raised by an action opposite to that of the second thinning means and the second weighting means from the television signal and the second auxiliary signal. Then, the television signal having both horizontal and vertical resolutions raised is displayed by the display unit.

In the case of using the representative auxiliary signals instead of the first and second auxiliary signals, the representative auxiliary signals may be used in place of all of the first and second auxiliary signals in the groups from which the representative auxiliary signals have been selected. However, it is desirable to use as the auxiliary signals the representative auxiliary signal in the adjoining group which is modified from the representative auxiliary signal of the subject group in accordance with the distance therebetween.

The resultant displayed image is higher in both horizontal and vertical resolutions than the image of the standard system. However, its diagonal resolution has not been improved since it has been lost by the first and second thinning means in the transmitter side. In the general image, however, it is rare that the diagonal resolution is high as compared with the horizontal and vertical resolutions. Accordingly, even if the diagonal resolution is low, it is possible to give such a virtual impression in that the wide band image in the transmitter side is displayed faithfully and the frequency turnaround phenomenon of the image is significantly reduced. The frequency turnaround phenomenon can be made almost unnoticeable by removing the horizontal high resolution information in the region having a large number of scanning lines from the television signal by a filter.

Moreover, omission of transmission of the diagonal high resolution information makes it possible to transmit a greater amount of horizontal and vertical high resolution informations and, also, to improve resolution of much more blocks than the systems of the above cited reference, by addition of increase in the high resolution information due to omission of the address informations of the blocks. Thus, the resolution is improved for a number of blocks and this enables to remove such a phenomenon in that the blocks of improved resolution appear to rise from the surface.

In the case of receiving the above mentioned transmitted signal by a conventional receiver, the resolution of the displayed image is not improved and is similar to that of the conventional broadcast wave.

These and other objects and features of this invention will be described in more detail below in connection with some preferred embodiments with reference to the accompanying drawings.

DESCRIPTION OF THE PREFERRED EMBODIMENTS

Figure 1:
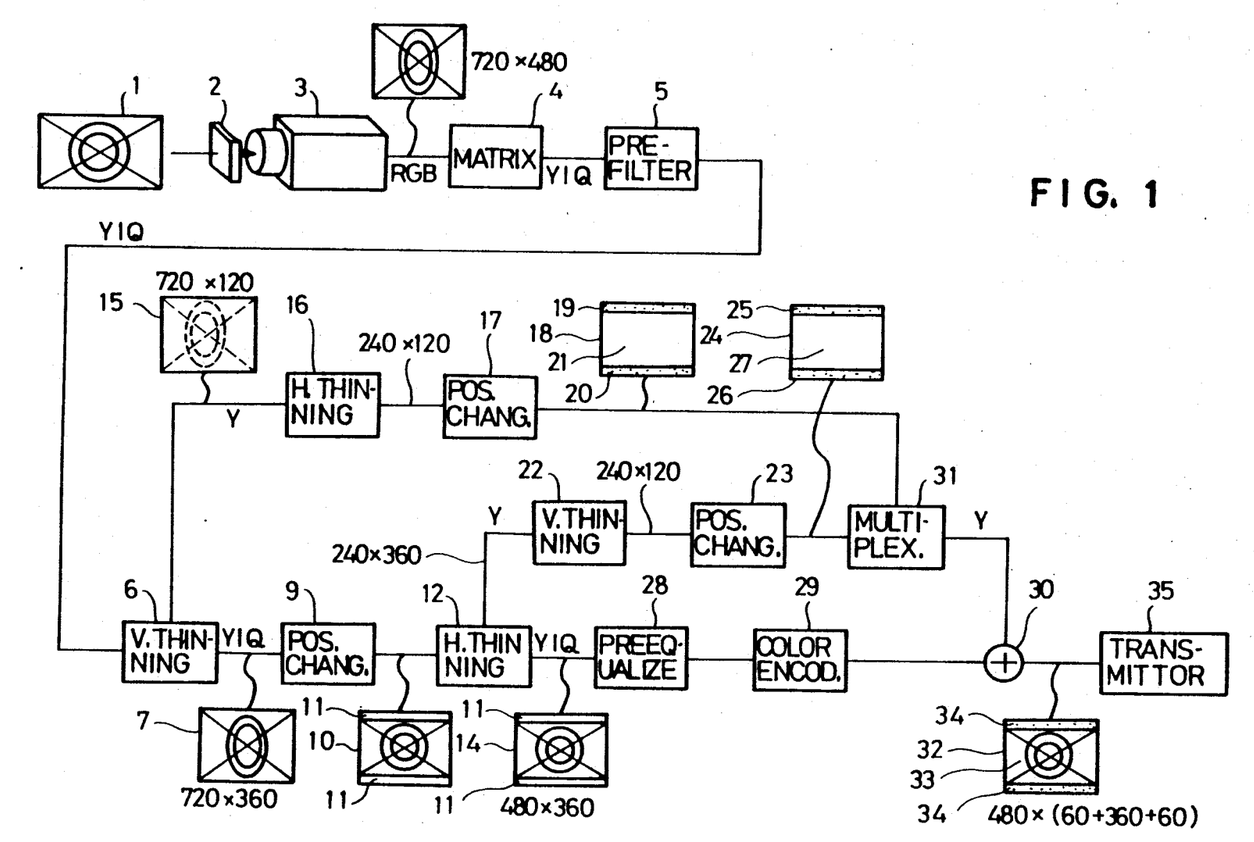
FIG. 1 is a block diagram showing an embodiment of the transmitting device according to this invention.

Referring first to FIG. 1 showing the transmitting device, 1 denotes a test pattern on a wide display screen whose width is much greater than its height as compared with a conventional television display screen. The test pattern is picked up through a width compression lens 2 by a color television camera 3. The color television camera 3 has 480 effective image scanning lines and high resolution of horizontal bandwidth above 6 MHz.

Figure 2A:
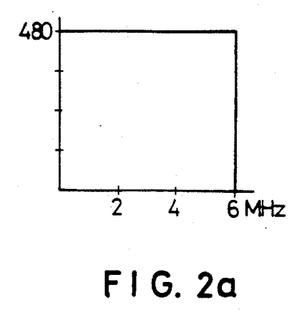
FIGS. 2a to 2h are explanatory diagrams of the frequency bands in respective portions of the device of FIG. 1.
Figure 2B:
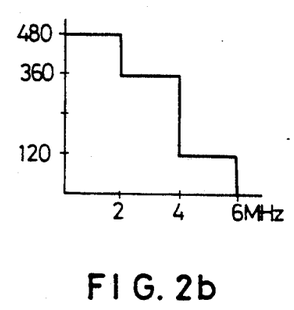

A signal obtained by the camera 3, having the number of horizontal pixels of about 720 and the number of vertical scanning lines of 480, is separated by a matrix circuit 4 into a luminance signal component Y and chrominance signal components I and Q, and the luminance signal component Y is subjected to band restriction in a prefilter 5. FIG. 2a shows the frequency band of the camera 3 and FIG. 2b shows the frequency band of the luminance signal after passing the prefilter 5. It need not to expressly restrict the bandwidth of the chrominance signal component by a prefilter since it is subjected to band restriction in a color encoder as described below.

Figure 2C:
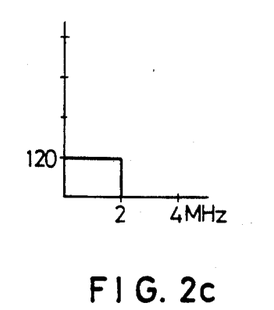
Figure 2D:
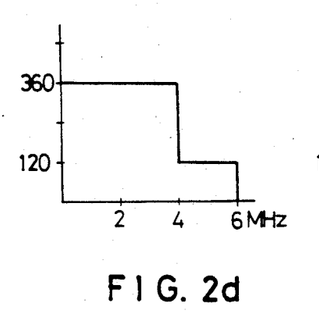
Figure 3A:
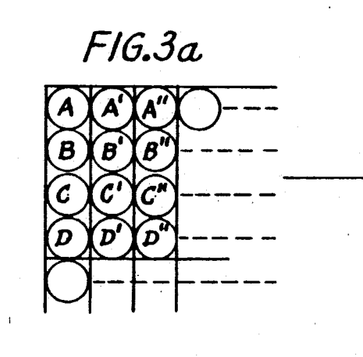
FIGS. 3A-3K are diagrams showing the pixel signals in respective portions of the device of FIG. 1.
Figure 3B:
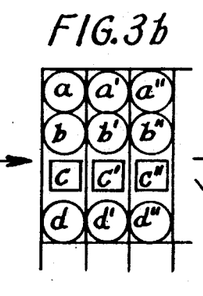
Figure 3C:
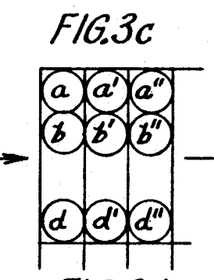
Figure 3D:
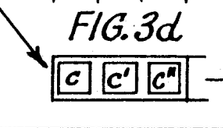
Figure 4:
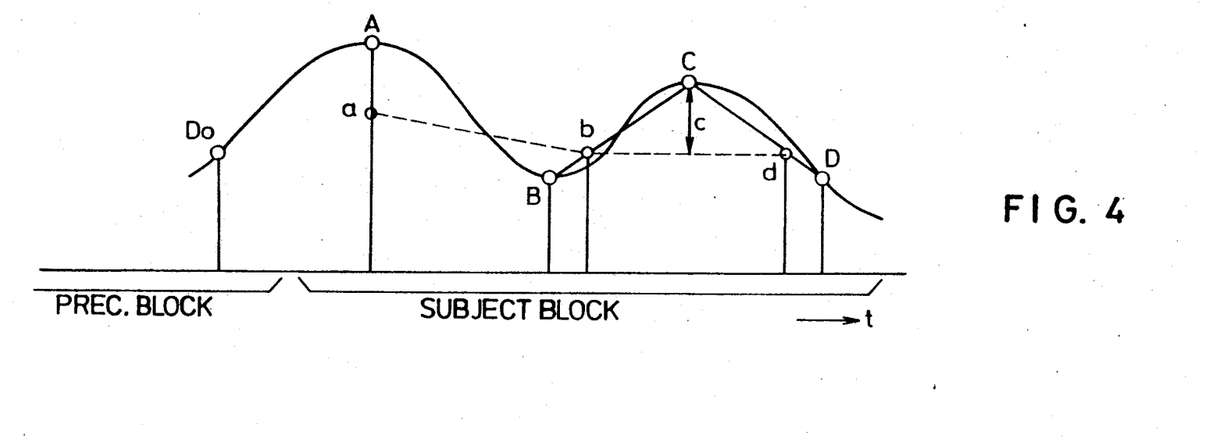
FIG. 4 is an explanatory diagram of the thinning and weighting operations in the vertical thinning circuit in the device of FIG. 1.

The output of the prefilter 5 is subjected to pixel amplitude correction and thinning of the number of pixels (i.e., the number of scanning lines) in the vertical direction as shown in FIG. 4 in a vertical thinning circuit 6. In the circuit 6, the image screen 7 is divided into vertical blocks 8, 8', 8", ... each including four pixels A, B, C and D as shown in FIG. 3(a) and, in each block, four pixel signals A, B, C and D are converted as follows into three pixel signals a, b and d and an auxiliary signal c which appear natural in their equal interval arrangement as being weighted based upon their positions as shown in FIG. 4.

$$a = 1/6 D_0 + 4/6 A + 1/6 B$$

$$b = \tfrac{2}{3} B + \tfrac{1}{3} C$$

$$d = \tfrac{1}{3} C + \tfrac{2}{3} D$$

$$c = -\tfrac{1}{3} + \tfrac{2}{3} C - \tfrac{1}{3} D$$

where $D_0$ is the endmost pixel signal of the preceding block. FIG. 3(b) shows a signal converted as above and, by thinning out the signal c therefrom as shown in FIG. 3(d), the number of pixels in the block 8 is reduced to three, namely, a, b and d and the bandwidth is reduced as shown in FIG. 2d. The bandwidth of the thinned signal of FIG. 3(d) is as shown in FIG. 2c.

Figure 3E:
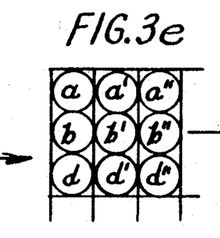

The remaining signals of FIG. 3(c) after thinning in the circuit 6 are gathered in the center of the screen 10 by a position changing circuit 9, so that the pixel blank produced between the pixels b and d disappears as shown in FIG. 3(e) and blank regions 11 are produced above and below the screen 10 as shown in FIG. 1. As a result, the image having its height compressed reduces its scanning lines to $\tfrac{3}{4}$ of the original image, namely, to 360 and makes its aspect ratio equal to that of the test pattern 1.

Figure 2E:
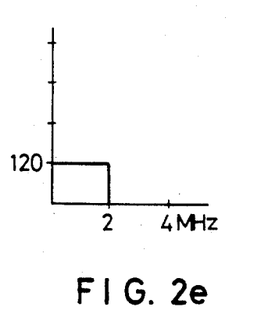
Figure 2F:
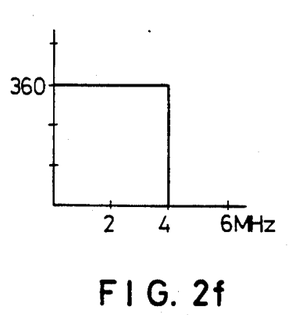
Figure 3F:
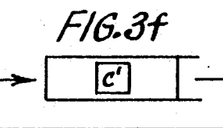
Figure 3G:
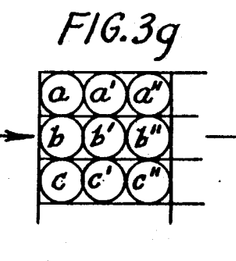
Figure 3H:
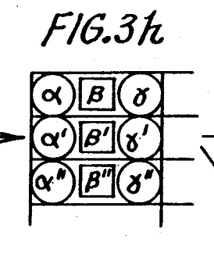
Figure 3I:
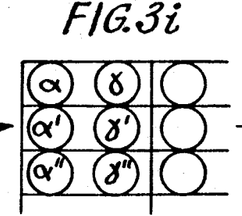

The vertically thinned signal as shown in FIG. 3(e) is subjected to pixel amplitude correction and horizontal thinning of the pixels in a horizontal thinning circuit 12 by a method similar to that of the vertical thinning circuit 6. More specifically, the signal of FIG. 3(e) is rearranged into blocks 13, 13', 13", . . . respectively including three horizontal pixels a, a' and a", b, b' and b", . . . as shown in FIG. 3(g). Then, the three pixel signals a, a' and a" are converted into two pixel signals α and γ as being weighted and an auxiliary signal β is also produced, as shown in FIG. 3(h). Thereafter, by thinning out the auxiliary signal β, an image signal including two pixels in each block is produced as shown in FIG. 3(i). The screen 14 given by this image signal has the number of horizontal pixels corresponding to $\tfrac{2}{3}$ of the original image, namely, 480 pixels, the number of horizontal scanning lines of 360 and a bandwidth as shown in FIG. 2f. FIG. 2e shows the bandwidth of the auxiliary signal β, β', β", . . . as shown in FIG. 3(j).

On the other hand, the thinned signal from the vertical thinning circuit 6 is composed of the blocks 8, 8', 8", . . . from which the auxiliary signals c, c', c", . . . have been extracted as shown in FIG. 3(d) and has 120 scanning lines including 720 pixels as shown in FIG. 1 as an image 15. This signal is thinned by a horizontal thinning circuit 16 to reduce its pixels on each scanning line into one third and converted into a vertical representative auxiliary signal having 240 vertical pixels and 120 scanning lines as shown in FIG. 3(f).

This representative auxiliary signal is divided into upper and lower halves by the center line in the position changing circuit 17. The upper half is moved to the uppermost portion 19 of the screen 18 and the lower half is also moved to the lowermost portion 20 of the screen 18 to produce a central blank portion 21. The height of the uppermost and lowermost portions 19 and 20 is equal to the height of the blank regions 11 in the output screen 10 of the position changing circuit 9.

Figure 3J:
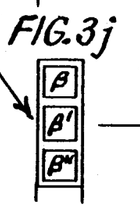

The auxiliary signals β, β', β", . . . of FIG. 3(j) thinned out by the horizontal thinning circuit 12 are composed of 360 horizontal scanning lines including 240 pixels. These signals are thinned by a horizontal thinning circuit 23 to reduce their scanning lines to one third, namely, to 120 lines and converted into a horizontal representative auxiliary signal having 120 scanning lines including 240 horizontal pixels. This representative auxiliary signal is also divided by a position changing circuit 23 similar to the position changing circuit 17 into two halves which are moved respectively to the uppermost portion 25 and the lowermost portion 26 of the screen 24, thereby forming a central blank portion 27. The heights of the uppermost and lowermost portions 25 and 26 and the blank portion 27 in the screen 24 are equal to those of the uppermost and lowermost portions 19 and 20 and the blank portion 21 of the screen 18, respectively.

Figure 2G:
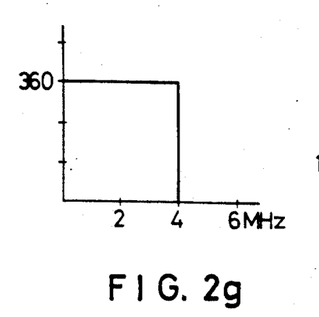
Figure 2H:
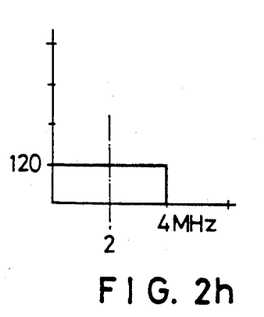

The image signal 14 having the upper and lower blank regions 11, which is produced by the above-mentioned horizontal thinning circuit 12, is sent through a preequalizer 28 and a color encoder 29 to a superposing circuit 30. On the other hand, the representative auxiliary signals 18 and 24 from the position changing circuits 17 and 23 are multiplexed together in a multiplex circuit 31 by quadrature modulation using a subcarrier wave of about 2 MHz and supplied to the superposing circuit 30 to be superposed on the blank regions 11. FIG. 2g shows a frequency band in a central image portion 33 of the superposed signal 32 and FIG. 2h shows a frequency band of the multiplexed representative auxiliary signals 34 located above and below the image portion 33. The superposed signal 32 is broadcasted by a transmitter 35.

Figure 5:
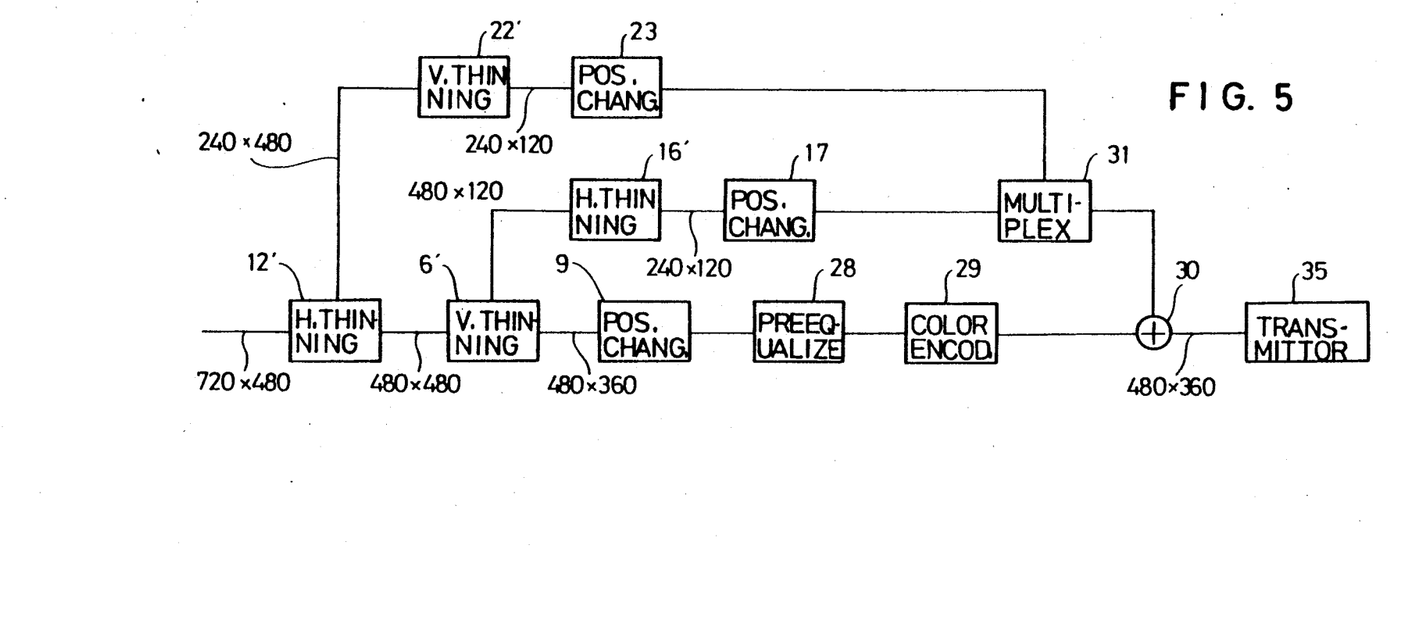
FIG. 5 is a block diagram showing another embodiment of the transmitting device according to this invention.

FIG. 5 shows another embodiment of the transmitting device. The output of the prefilter 5 shown in FIG. 1 is first thinned by a horizontal thinning circuit 12' from 720 to 480 horizontal pixels, then thinned by a vertical thinning circuit 6' from 480 to 360 horizontal scanning lines, gathered in the center of the screen by a position changing circuit 9 and sent through a preequalizer 28 and a color encoder 29 to a multiplex circuit 30. This signal is the same as the signal sent from the horizontal thinning circuit 12 through the preequalizer 28 and color encoder 29 to the multiplex circuit 30 in FIG. 1.

On the other hand, the signal thinned out by the horizontal thinning circuit 12' has 480 horizontal scanning lines of 240 pixels, which is more than the scanning lines of the auxiliary signal thinned out by the horizontal thinning circuit 12 of FIG. 1. However, by thinning the scanning lines by a vertical thinning circuit 22′ excessively more than the vertical thinning circuit 22, the number of the remaining scanning lines can be made 120 as same as that of FIG. 1. The auxiliary signal thinned out by the vertical thinning circuit 6′ has 480 horizontal pixels which are less than those of the signal thinned out by the vertical thinning circuit 6 of FIG. 1. However, by making the number of pixels thinned out by the horizontal thinning circuit 16′ less than that of the pixels thinned out by the horizontal thinning circuit 16 of FIG. 1, the number of the remaining pixels can be made 240 as same as in FIG. 1.

Accordingly, a similar operation can be obtained in the transmitting device of FIG. 5, since the signals supplied to the multiplex circuit 31 and the superposing circuit 30 are exactly same as those in FIG. 1.

Figure 3K:
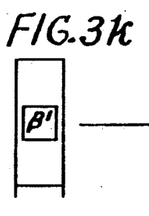
Figure 6:
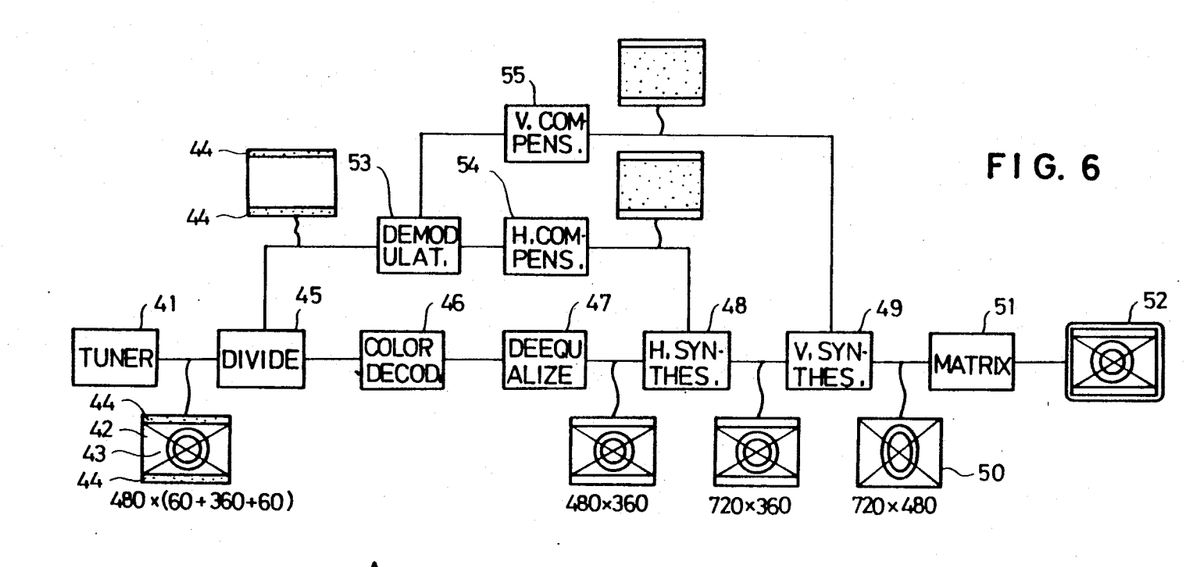
FIG. 6 is a block diagram showing an embodiment of the receiving device according to this invention.
Figure 7A:
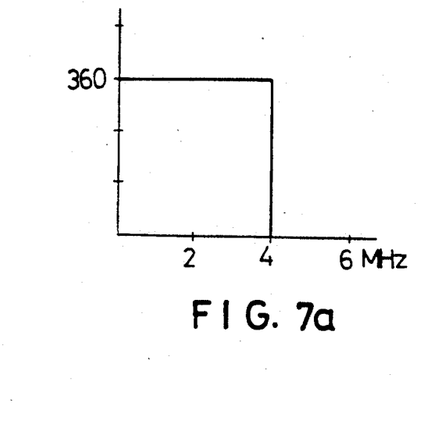
FIGS. 7a to 7f are explanatory diagrams of the frequency bands in respective portions of the device of FIG. 6.
Figure 7B:
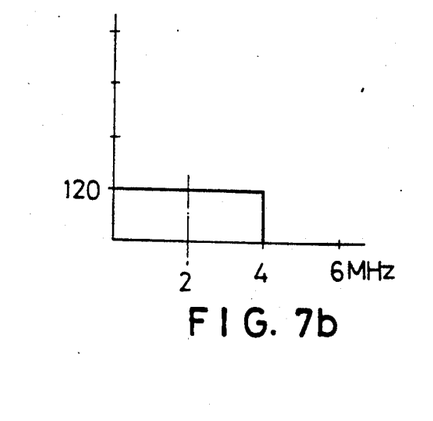
Figure 7C:
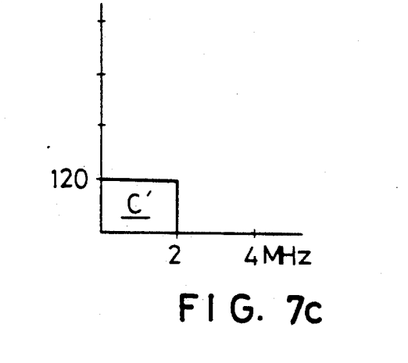
Figure 7D:
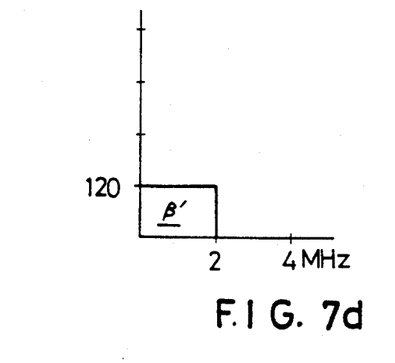

Referring to FIG. 6 showing the receiving device, a signal 42 obtained from a tuner 41 is the same as the signal 32 in the transmitter side as shown in FIG. 1 and has an auxiliary signal portions 44 each carried by 60 scanning lines before and after (above and below in the screen) an image portion 43 composed of 360 horizontal scanning lines including 480 pixels. The frequency bands of the image portion 43 and the auxiliary signal portions 44 are as shown in FIGS. 7a and 7b, respectively. The image portion 43 and the auxiliary signal portions 44 are divided in time by a dividing circuit 45 and the image portion 43 is supplied through a color decoder 46, a deequalizer 47, a horizontal synthesizing circuit 48, a vertical synthesizing circuit 49 and a matrix circuit 51 to a color kinescope 52. The divided auxiliary signal portions 44 are separated by a demodulating circuit 53 into a vertical representative auxiliary signal c′ of a content as shown in FIG. 3(f) and a horizontal representative auxiliary signal $\beta'$ of the content as shown in FIG. 3(k). FIGS. 7c and 7d show the frequency bands of the separated representative auxiliary signals, respectively.

As for the horizontal representative auxiliary signal $\beta'$, a horizontal compensation circuit 54 first recovers the components $\beta$ and $\beta''$ thinned out from a signal shown in FIG. 3(j) by the vertical thinning circuit 22 of the transmitter side, in the following manner. As shown in (j) and (k) of FIG. 3, the horizontal representative auxiliary signal $\beta'$ corresponds to a pixel extracted from each block including three vertical pixels. Therefore, when the representative auxiliary signal of the preceding block is $\beta_0'$ and the representative auxiliary signal of the succeeding block is $\beta_1'$, it is possible to smoothly and reasonably transfer all auxiliary signals $\beta_0$, $\beta_0'$, $\beta_0''$, $\beta$, $\beta'$, $\beta''$, $\beta_1$, $\beta_1'$ and $B_1''$ of the preceding block, the subject block 55 and the succeeding block, by putting as follows.

$$\beta = \tfrac{1}{3}\beta_0' + \tfrac{2}{3}\beta'$$

$$\beta'' = \tfrac{2}{3}\beta' + \tfrac{1}{3}\beta_1'$$

The horizontal compensation circuit 54 moves the resultant horizontal auxiliary signals $\beta$, $\beta'$ and $\beta''$ into the state after thinned by the horizontal thinning circuit 12 of the transmitter side, namely, to the position of the image portion 43 in the image signal 42.

Figure 7E:
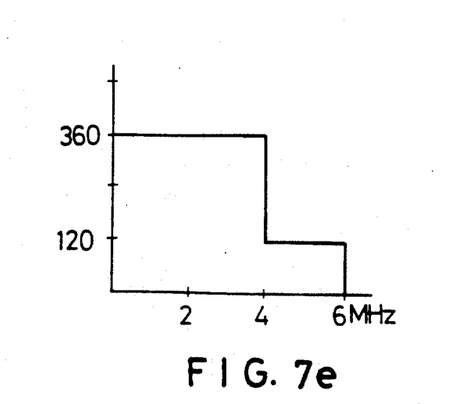
Figure 7F:
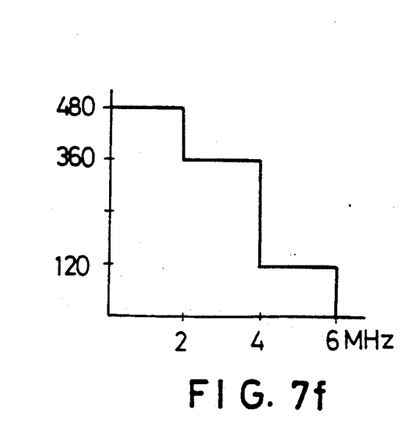

The horizontal synthesizing circuit 48 fits the auxiliary signals $\beta$, $\beta'$ and $\beta''$ in the image signal of two pixels per block, $(\alpha\text{-}\gamma)$, $(\alpha'\text{-}\gamma')$ and $(\alpha''\text{-}\gamma'')$, of FIG. 3(i) as shown in FIG. 3(h) to recover an image signal of three pixels per block as shown in FIG. 3(g). FIG. 7e shows the frequency band of this image signal.

Figure 8:
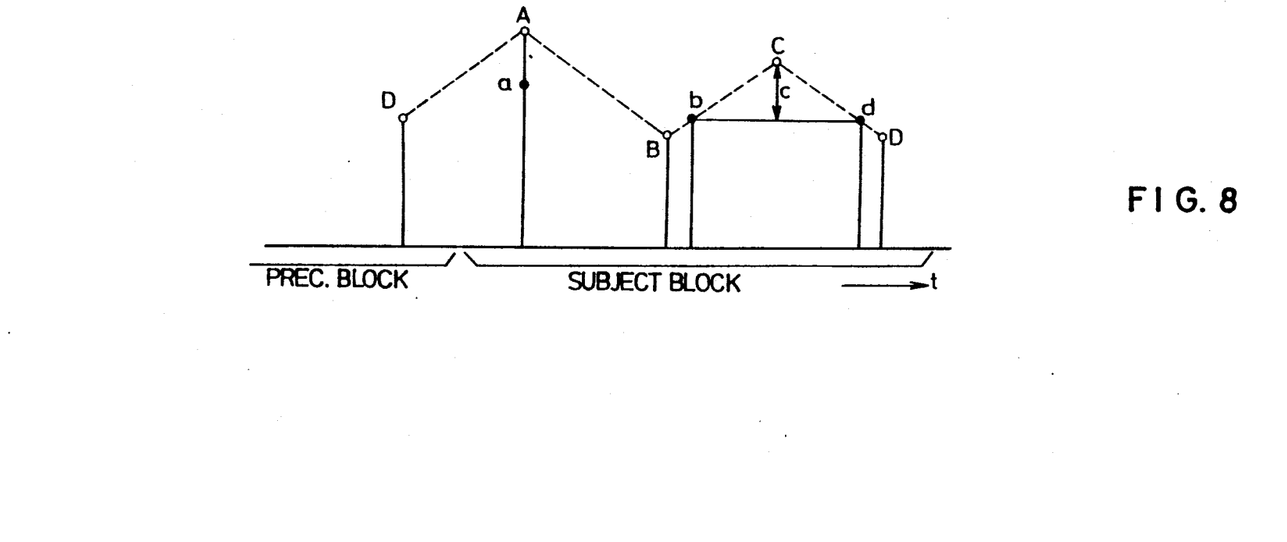
FIG. 8 is an explanatory diagram of the pixel synthesizing operation of the vertical synthesizing circuit of the device of FIG. 6.

In a similar manner, a vertical compensation circuit 55 recovers the auxiliary signals c, c′ and c″ shown in FIG. 3(d) from the vertical representative auxiliary signal c′ of FIG. 3(f) and returns them to the position of the image portion 43 from the uppermost and lowermost portions of the screen. The vertical synthesizing circuit 49 fits the auxiliary signals c, c′ and c″ in the image signal of three pixels, (a b-d), (a′b′-d′) and (a″b″-d″) shown in FIG. 3(c) and recovers a four pixel image signal by the following arithmetic operation.

$$C = \tfrac{1}{4}b + \tfrac{1}{4}d + c$$

$$B = 5/4b - \tfrac{1}{4}d - \tfrac{1}{4}c$$

$$D = -\tfrac{1}{4}b + 5/4d - \tfrac{1}{4}c$$

$$A = 3/2a - \tfrac{1}{4}D_0 - \tfrac{1}{4}B$$

where $D_0$ is a pixel positioned on the directly preceding scanning line and just above the pixel A.

The resultant image signal 50 has 720 horizontal pixels and 480 scanning lines and is a fine signal which is quite similar to the signal supplied to the vertical thinning circuit 6 of the transmitter side. The image signal 50 passes the matrix circuit 51 and is displayed by the kinescope 52 with its height compressed to $\tfrac{3}{4}$.

When the broadcast wave transmitted from the transmitter 35 of FIGS. 1 or 5 is received by a conventional receiver, the image signal 42 obtained from the tuner 41 is displayed as it is by the kinescope. Although the displayed image is poorer in fineness than the image displayed by the receiving device of FIG. 5 since it is not compensated for the numbers of horizontal and vertical pixels as described above, its compatibility is not affected.

We claim:

1. A television system comprising a transmitting device and a receiving device, characterized in that
said transmitting device comprises first thinning means for dividing na image screen into vertical blocks each including a plurality of pixels and thinning out a certain pixel from each block, first weighting means for rearranging the remaining pixels at equal intervals and weighting each pixel moved to a new position to compensate for the difference of the pixel at the new position from the wave height of the original signal at said new position, second thinning means for dividing said image screen into horizontal blocks each including a plurality of pixels and thinning out a certain pixel from each block, second weighting means for rearranging the remaining pixels at equal intervals and weighting each pixel moved to a new position to compensate for the difference of the pixel at the new position from the wave height of the original signal at said new position, means for preparing a first auxiliary signal including an information of the difference between the pixel thinned out by said first thinning means and the mean value of two weighted pixels which were respectively positioned above and below said pixel before thinning, means for preparing a second auxiliary signal including an information of the difference between the pixel thinned out by said second thinning means and the mean value of two weighted pixels which were respectively positioned at the left and right of said pixel before thinning, and means for transmitting said first and second auxiliary signals by mutually multiplexing the same and adding to a television signal composed only of the pixels remaining after being thinned by said first and second thinning means and then weighted by said first and second weighting means, and said receiving device comprises means for separating a received signal into said television signal and said first and second auxiliary signals, first and second synthesizing means for recovering from said television signal and said first and second auxiliary signals pixel signals corresponding to the pixels before weighted by said first and second weighting means, respectively, and restoring said pixel signals to a state corresponding to the state before being thinned by said first and second thinning means, respectively, and a display unit for displaying an image based upon the signals treated by said first and second synthesizing means.

* * * * *